(12) United States Patent  
Gao

(10) Patent No.: US 11,736,793 B2  
(45) Date of Patent: Aug. 22, 2023

(54) ELECTRONIC DEVICE AND CONTROL METHOD FOR OPTICAL COLLECTION

(71) Applicant: Lenovo (Beijing) Co., Ltd., Beijing (CN)

(72) Inventor: Ying Gao, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/036,836

(22) Filed: Sep. 29, 2020

(65) Prior Publication Data

US 2021/0099653 A1     Apr. 1, 2021

(30) Foreign Application Priority Data

Sep. 30, 2019   (CN) .......................... 201910943514.3

(51) Int. Cl.
| | |
|---|---|
| *H04N 23/63* | (2023.01) |
| *H04N 23/57* | (2023.01) |
| *H04N 23/65* | (2023.01) |

(52) U.S. Cl.
CPC ........... *H04N 23/633* (2023.01); *H04N 23/57* (2023.01); *H04N 23/65* (2023.01)

(58) Field of Classification Search
None
See application file for complete search history.

(56) References Cited

U.S. PATENT DOCUMENTS

| | | | | |
|---|---|---|---|---|
| 8,902,318 | B1* | 12/2014 | Haddad | H04N 5/2258 348/207.99 |
| 2003/0125008 | A1* | 7/2003 | Shimamura | H04N 5/232939 455/344 |
| 2005/0068423 | A1* | 3/2005 | Bear | H04N 5/23203 348/207.99 |
| 2008/0136961 | A1* | 6/2008 | Latella | H04N 5/2256 348/E5.029 |
| 2011/0058255 | A1* | 3/2011 | Weiss | G03B 11/043 359/511 |
| 2013/0176484 | A1* | 7/2013 | Pilliod | H04N 5/2254 65/56 |

(Continued)

FOREIGN PATENT DOCUMENTS

| | | |
|---|---|---|
| CN | 103488939 A | 1/2014 |
| CN | 105338239 A | 2/2016 |

(Continued)

*Primary Examiner* — James M Hannett
(74) *Attorney, Agent, or Firm* — Anova Law Group, PLLC

(57) ABSTRACT

An electronic device includes an optical collection device, a display device, and a control device. The optical collection device has a first power consumption state and a second power consumption state. In the first power consumption state, the optical collection device is configured to obtain optical data in a collection range. The display device includes an optical component collection arranged in an array. A unit optical component of the optical component collection changes an optical state according to a control signal. The control device is configured to control a first optical component subset of the first region. The first region has a first optical state and a second optical state. In the second optical state, the optical collection device obtains the optical data that do not characterize the external environment of the electronic device.

17 Claims, 6 Drawing Sheets

(56) References Cited

U.S. PATENT DOCUMENTS

| | | | |
|---|---|---|---|
| 2013/0222609 A1* | 8/2013 | Soffer | G06F 1/1605 |
| | | | 348/207.1 |
| 2016/0063274 A1* | 3/2016 | Martin | H04N 5/2257 |
| | | | 726/19 |
| 2016/0273908 A1* | 9/2016 | Rose | H04N 5/23216 |
| 2018/0059510 A1* | 3/2018 | Gustaveson, II | H04N 5/2254 |

FOREIGN PATENT DOCUMENTS

| | | | | |
|---|---|---|---|---|
| CN | 106292017 A | 1/2017 | | |
| CN | 109190369 A | 1/2019 | | |
| CN | 110058443 A | 7/2019 | | |
| WO | WO-2019009894 A1 * | 1/2019 | | G03B 11/041 |

* cited by examiner

ELECTRONIC DEVICE AND CONTROL METHOD FOR OPTICAL COLLECTION

CROSS-REFERENCE TO RELATED APPLICATION

This application claims priority to Chinese Patent Application No. 201910943514.3, filed on Sep. 30, 2019, the entire content of which is incorporated herein by reference.

TECHNICAL FIELD

The present disclosure relates to the electronic technology field and, more particularly, to an electronic device and a control method.

BACKGROUND

Electronic devices, such as smartphones, tablets, etc., have become essential products for people's daily life. An electronic device may generally include an optical collection device, such as a camera. However, the optical collection devices need to be placed separately from other devices and set toward the external environment, which may affect the integrity of the electronic device.

SUMMARY

Embodiments of the present disclosure provide an electronic device including an optical collection device, a display device, and a control device. The optical collection device has a first power consumption state and a second power consumption state. In the first power consumption state, the optical collection device is configured to obtain optical data in a collection range. The display device includes an optical component collection arranged in an array. A unit optical component of the optical component collection changes an optical state according to a control signal. The display device includes a first region located in the collection range of the optical collection device. The control device is configured to control a first optical component subset of the first region. The first region has a first optical state and a second optical state. In the first optical state, the optical collection device obtains first optical data characterizing an external environment of the electronic device. In the second optical state, the optical collection device obtains second optical data that do not characterize the external environment of the electronic device.

Embodiments of the present disclosure provide a control method for controlling an optical collection device. The method includes: responding to a control signal to control a first optical component subset of a first region of a display device of an electronic device to change an optical state of the first region; if a changed optical state is the first optical state, obtaining a first optical data characterizing an external environment of the electronic device; and if a changed optical state is the second optical state, obtaining the second optical data not characterizing the external environment of the electronic device. The first region includes a first optical state and a second optical state. The display device includes an optical component collection arranged in an array. The first optical component subset is a collection of a plurality of unit optical components of the optical component collection. An optical collection device of the electronic device includes a first power consumption state and a second power consumption state. In the first power consumption state, optical data in a collection range is obtained. The first region is located in the collection range of the optical collection device.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

Technical solutions of embodiments of the present disclosure are described in connection with the accompanying drawings. Described embodiments are merely exemplary and some embodiments of the present disclosure but not all embodiments. Based on the embodiments of the present disclosure, all other embodiments obtained by those of ordinary skill in the art without creative effort should be within the scope of the present disclosure.

To facilitate the description, the accompanying drawings only show parts related to the relevant disclosure. With no conflict, embodiments of the present disclosure and features of embodiments may be combined with each other. The terms such as "system," "electronic device," "device," "unit," and/or "module" are used as a method to distinguish different components, elements, parts, portions, or assemblies of different levels. However, if other terms may realize the same purpose, the terms may be replaced by the other terms.

In addition, unless the context clearly indicates exceptional circumstances, the terms "a", "an", "one," and/or "the" may not refer to singular, but may also include plural. Generally speaking, the terms "including" and "containing" may only suggest that the steps and elements that have been clearly identified are included, and these steps and elements do not constitute an exclusive list, and the method or device may also include other steps or elements. The element defined by a sentence "including a . . . " does not exclude the existence of other identical elements in the process, method, or equipment including the elements.

In the description of embodiments of the present disclosure, unless otherwise specified, "/" means or, for example, AB may mean A or B. The term "and/or" in the present specification may describe an association relationship between associated objects and indicate three kinds of relationships. For example, A and/or B, which may represent three situations of A alone, A and B, and B alone. In addition, in the description of embodiments of the present disclosure, the term "multiple" refers to two or more. The terms "first," "second" are used for descriptive purposes only, and should not be understood to indicate or imply relative importance or implicitly indicating the number of indicated technical features. Thus, features defined as "first" and "second" may explicitly or implicitly include one or more of the features.

Figure 1:
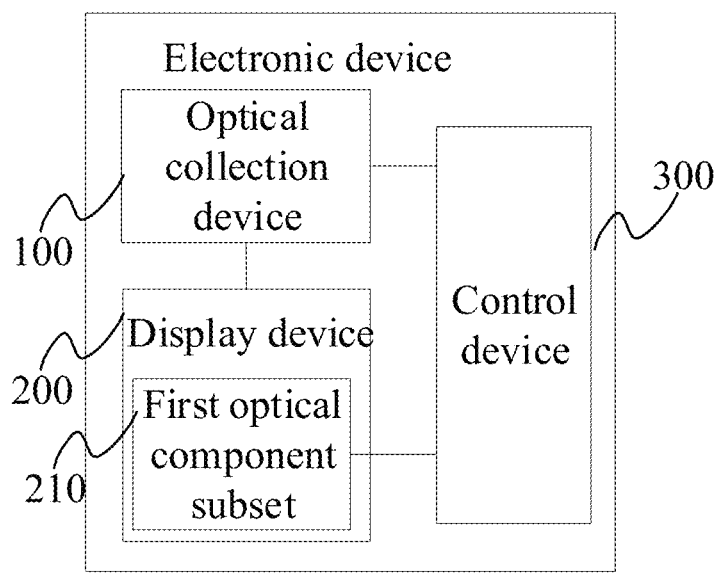
FIG. 1 illustrates a schematic structural diagram of an electronic device according to some embodiments of the present disclosure.

FIG. 1 illustrates a schematic structural diagram of an electronic device according to some embodiments of the present disclosure. The electronic device includes an optical collection device 100, a display device 200, and a control device 300. The optical collection device 100 may include a first power consumption state and a second power consumption state. If the optical collection device 100 is at the first power consumption state, the optical collection device 100 may be configured to obtain optical data in a collection range.

In some embodiments, when the electronic device is required to collect the optical data, such as an image, from an external environment, the optical collection device may enter a working state. When the electronic device does not need to collect an image of the external environment, the optical collection device may be in a non-working state. The power consumption of the optical collection device is different in the above two states. Therefore, in some embodiments, the device may determine whether the optical collection device is working according to a value of the power consumption, and record the working state as the first power consumption state and the non-working state as the second power consumption state. Therefore, when the optical collection device 100 is at the first power consumption state, the optical collection device 100 may work normally and obtain the optical data of the external environment of the electronic device to collect the image.

In some embodiments, the optical collection device 100 may be configured to collect the optical data corresponding to a collection application scenario with one or more combinations of an image, depth, brightness, color temperature, etc. Under different collection application scenarios, the optical data collected by the optical collection device 100 may be different. Correspondingly, a composition structure of the optical collection device 100 configured to collect the corresponding optical data may also be different.

In some embodiments, in the image collection application, the optical collection device 100 may be configured to collect the image of an external environment of the electronic device. Under this situation, the optical collection device 100 may include but is not limited to, components of a lens, an image sensor, etc. In some embodiments, the working process of how the optical collection device 100 collects the image in this scenario is not described in detail.

In a depth information collection application, the optical collection device 100 may be configured to collect depth information of the external environment of the electronic device to obtain a corresponding three-dimensional image. In some embodiments, an infrared signal may be used to collect the depth information using a time of flight (TOF) ranging method. In other embodiments, the depth information may also be collected with a structured light method. Moreover, a binocular stereo vision technology may be used to collect the depth information of the external environment of the electronic device.

As such, the above-described optical collection device 100 may include a depth camera based on the TOF, structured light, or binocular stereo vision. Therefore, in the depth information collection application, the optical collection device 100 may include a signal transmitter, a signal receiver, etc., which may be determined according to the method used to obtain the depth information, and is not described in detail here.

In a brightness collection application, the optical collection device 100 may use the collected optical data to adjust a brightness of a first region of the display device 100 to satisfy the collection requirement of the current environment. Under this situation, the optical collection device 100 may include but is not limited to a brightness sensor configured to collect brightness data. In the present disclosure, a specific implementation process of the brightness adjustment is not described in detail.

In the depth information collection application and the image collection application, the brightness of the first region of the display device may affect the depth information and the image collection effects. Therefore, in the collection application of embodiments, the device may combine the optical data collected by the optical collection device to adjust the brightness of the first region to a suitable brightness. Then, the device may collect depth information/images, which is not described in detail.

In a color temperature collection application, color temperature is a measurement unit that indicates the color components contained in the light, which is also a temperature measurement method. Since the color temperature of the light is different at a different temperature, the color of the captured image may also be different. For example, when the device photographs under a clear blue sky, the color temperature of the light is higher. By using the color temperature information collected by the optical collection device 100 in such an environment, the obtained image may have a cooler tone. When the device photographs during sunset, the color temperature of the light may be lower. By using the color temperature information collected by the optical collection device 100 in such an environment, the obtained image may have a warmer tone.

As such, the color temperature is an important feature of the visible light in the photographing application. If the color temperature of the light source is different, the feeling of the final obtained image may also be different. Therefore, the optical collection device 100 may include but is not limited to a color temperature sensor configured to collect the color temperature data to adjust the display color. As such, the user photographing requirement for the external environment may be satisfied.

In some embodiments, the brightness may also affect the display color. For example, under a high color temperature light source, the user may have a cold atmosphere with low brightness. Under a low color temperature light source, the user may have a stuffy feeling if the brightness is too high. As such, in the display color adjustment application, the present disclosure may be realized in connection with the brightness data and the color temperature data. Moreover, in the depth information/image collection application, the different color temperature data may affect the effectiveness of the collected depth information/image. Therefore, in the depth information/image collection application, the device may combine the brightness data as well as the color temperature data, which is not be described in detail.

The above-described optical collection device 100 may include the image sensor, the brightness sensor, the color temperature sensor, and/or a depth detector composed of the signal transmitter and the signal receiver, etc. The product type and composition structure of the optical collection device 100 suitable for the corresponding scenario may be determined according to the requirements of the specific collection application scenario and the impact factors of the collection effect, which are not limited to the content listed above.

The display device 200 may include an optical component collection arranged in an array. A unit optical component of the optical component collection may change an optical state according to a control signal.

In some embodiments, the optical component collection may include a pixel (i.e., an image element) collection. Each pixel (i.e., a unit optical component) may display a plurality of optical states, which may be realized by the control signal controlling and changing the optical state of the corresponding pixel. In some embodiments, the device may display the information image and adjust the display content through the optical states of the combined pixels, which is not described in detail.

In some embodiments, the display device 200 may include a liquid-crystal device. The liquid-crystal device may be composited of a plurality of liquid-crystal particles. The plurality of liquid-crystal particles may be regularly arranged into a certain shape. If the power is on, the plurality of liquid-crystal particles may be rearranged, which may increase the transmittance of light through the plurality of liquid-crystal particles. As a result, in the optical component collection, the unit optical components supported by the liquid crystal particles component may change the optical state, such that the optical collection device may collect the first optical data that can characterize the external environment of the electronic device, e.g., realize the image collection of the external environment.

If the power is off, the plurality of liquid-crystal particles may be arranged irregularly, which may greatly reduce the light transmittance. The optical state of the unit optical component of the display device 200 may change. In this case, the optical collection device may collect a second optical data that cannot characterize the external environment of the electronic device, which may shield the optical collection device. The display device 200 may include a first region. The first region is located in the collection range of the optical collection device 100. As such, the optical collection device 100 of the electronic device may be arranged corresponding to the first region. Moreover, the optical data collection direction of the optical collection device 100 may be the direction toward the external environment through the first region. As such, when the optical collection device 100 is in the first power consumption state, the optical collection device 100 may collect the optical data of the external environment through the first region.

For example, if the optical collection device 100 is a camera, the lens of the camera may correspond to the first region, and the lens may face the external environment through the first region. As such, by changing the optical state of the first region, the camera may normally collect the image of the external environment or shield the camera lens. By shielding the camera lens, potential security issues, which may be caused by illegally using the application having the camera permission to collect the optical data without notifying the user of the electronic device, may be avoided.

Figure 2:
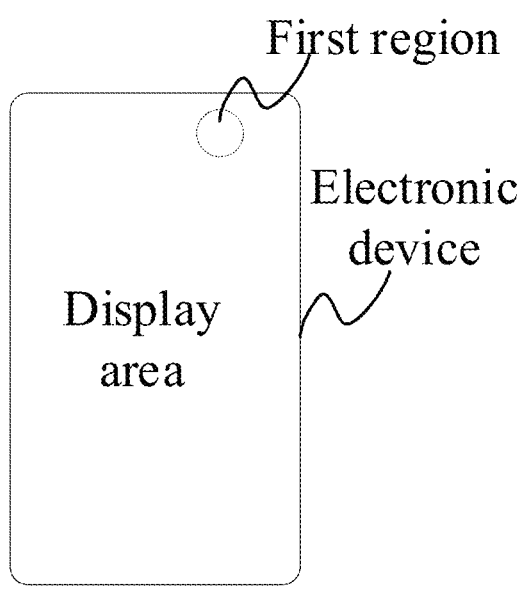
FIG. 2 illustrates a schematic structural diagram of the electronic device according to some embodiments of the present disclosure.

Embodiments of the present disclosure do not limit the specific position of the first region at the entire display region of the display device 200. The display region of the display device may include the entire region of the display screen. The position of the first region at the display region may be determined according to a factor such as a user's habit of using the electronic device. For example, as shown in FIG. 2, the first region may be located at a top region of the display screen of a cell phone.

In connection with the description of the optical collection device 100, when the optical collection device 100 is at the first power consumption state, the collection range of obtaining the optical data may include the entire display region of the display device, or the maximum range that the optical collection device may sense the optical data in the display region. The present disclosure does not limit the collection range, which may be determined by the specific application scenario. No matter what the range is, the first region of the display device 200 is always located in the collection range.

The control device 300 may be at least configured to control a first optical component subset 210 in the first region, such that the first region may include at least a first optical state and a second optical state.

According to the description of the display device 200, the first optical component subset 210 may include a collection of the plurality of unit optical components located in the first region in the optical component collection. In connection with the description of the display device, since each unit optical component may include at least two optical states, such as the first optical state and the second optical state, the device may control the optical state to change through the control signal. Therefore, if the optical state of each unit optical component composing the first optical component subset 210 changes uniformly, the optical state of the entire first region may be changed between the first optical state and the second optical state.

In some embodiments, the control signal may include an instruction output by the control device 300, which may cause the first optical component subset 210 to respond to the instruction and control the optical state of each of the unit optical component included in the first optical component subset 210 to adjust to the first optical state or the second optical state. In some embodiments, the control signal may also include a control instruction received by the control device 300. The control device 300 may control the first optical component subset 210 by responding to the control signal to change the optical state of the first region. The present disclosure does not limit a generation method and content of the control signal.

In addition, many applications may require permission to use the optical collection device of the electronic device when operating. An illegal user may use these applications to collect the optical data without notifying the user of the electronic device, which may bring potential security issues. To solve the technical problem, in some embodiments, when the user does not need to obtain the optical data characterizing the external environment of the electronic device, it is desirable to block the optical collection device from collecting the optical data characterizing the external environment of the electronic device.

Therefore, in the first optical state, the optical collection device 100 may obtain the first optical data which may characterize the external environment of the electronic device. In the second optical state, the optical collection device 100 may obtain the second optical data which may not characterize the external environment of the electronic device. As such, when the user does not need to obtain the optical data for characterizing the external environment of the electronic device, the control device may directly control the first optical component subset to change the optical state of the first region to the second optical state. In this case, the optical collection device may only collect the second optical data which may not characterize the external environment of the electronic device. As such, even if the optical collection device is called through other applications, the first optical data which characterizes the external environment of the electronic device may not be obtained, which may eliminate potential security issues and improve the security of using the electronic device.

According to the above-described description, during the operation of the optical collection device, that is, in the first power consumption state, the first region of the display device may be in different optical states. Even though, the optical collection device may collect the optical data. However, the optical data contents collected in the two optical states may be different, which may be determined according to the collection requirements of the optical data in a specific application scenario. The present disclosure does not limit the contents of the first optical data and the second optical data.

In the first optical state, the first light transmittance of the first region of the display device may be greater than a second light transmittance of the first region in the second optical state. In general, the first light transmittance is greater than 50%, and the second light transmittance is smaller than 50%. The first optical data, which may characterize the external environment of the electronic device, may refer to the optical data collected by the optical collection device when the first light transmittance is greater than a first threshold. The second optical data, which may not able to characterize the external environment of the electronic device, may refer to the optical data collected by the optical collection device when the second light transmittance is smaller than a second threshold. The present disclosure does not limit the specific value for the first light transmittance, the first threshold, the second light transmittance, and the second threshold.

Figure 3:
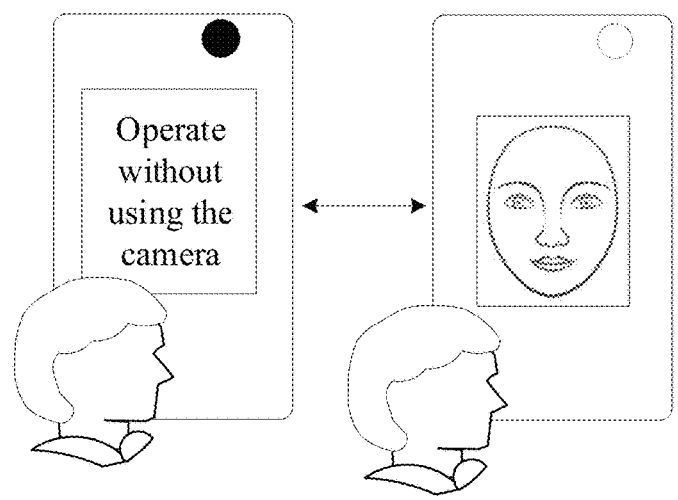
FIG. 3 illustrates a schematic diagram showing an application scenario of the electronic device according to some embodiments of the present disclosure.

In some embodiments, the first threshold maybe 85%, and the second threshold maybe 15%. Therefore, in the first optical state, the first light transmittance of the first region may be any value that is greater than 85%. In this case, the first light transmittance in an optical extreme state maybe 100%. For example, in the image collection scenario shown on the right side of FIG. 3, when the optical collection device is needed to collect the image, the first region may be controlled to be transparent or nearly transparent with the above-described method. As such, the optical collection device may obtain a clear image.

Similarly, in the second optical state, the second light transmittance of the first region may be any value smaller than 15%. In this case, the second light transmittance in an optical extreme state maybe 0%. For example, in the image collection scenario shown at the left side of FIG. 3, when the image collection does not need to be performed, the first region may present the display state of non-transparent or nearly transparent to cause the optical collection device not to obtain an effective image of the external environment, e.g., a black image or an image with the image content that cannot be effectively identified.

For example, the optical collection device 100 may be a camera. Since the camera is hidden behind a liquid crystal cover of the display device, to realize the above technical effects, in connection with the description of the display device and the different optical states of the first region, the liquid crystal cover may use the liquid crystal particles, which are arranged in a straight line with power on, to realize a high light transmittance. When the power is off, the liquid crystal particles may be in a scattered state, thus, the liquid crystal cover may realize a low light transmittance. In the present disclosure, the liquid crystal cover may be designed in the first region of the display screen corresponding to the camera based on the above-described principle. As such, the light transmittance of the liquid crystal cover may be changed by switching the voltage to change the optical state of the first region to protect privacy.

Figure 4:
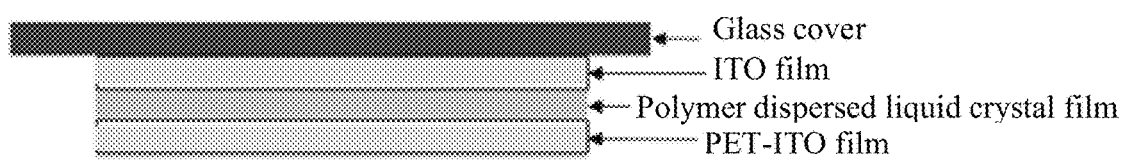
FIG. 4 illustrates a schematic structural diagram showing a liquid crystal coating layer of a first region of the electronic device according to some embodiments of the present disclosure.
Figure 4:

In some embodiments, an extra liquid crystal coating may be added in front of the camera to achieve the above purpose. FIG. 4 illustrates a schematic structural diagram showing the liquid crystal coating layer of the first region of the electronic device according to some embodiments of the present disclosure. The liquid crystal coating may be prepared under a glass cover of a touch screen. The glass cover may be used as a fixed protection layer of one side of the liquid crystal coating. Two layers of indium tin oxide (ITO) conductive films (e.g., ITO film, PET (Polyethylene terephthalate)-ITO film in FIG. 4) with the middle of the two ITO conductive films coated with a polymer dispersed liquid crystal (PDLC) film are used to form the liquid crystal coating with a controllable light transmittance, which is not limited to the liquid crystal coating structure described of embodiments of the present disclosure.

Since the glass of the touch screen is directly used as a fixed protection layer for one side of the liquid crystal coating layer, the number of layers and thickness of the liquid crystal layer may be reduced. By using the PDLC liquid crystal material with a high light transmittance, the first region may be ensured to be in the first optical state. As such, the optical collection device 100 may reliably collect the first optical data that may characterize the external environment of the electronic device.

The composition structure of the liquid crystal cover of the display device 200 is not limited to the structure shown in FIG. 4.

In summary, in the present disclosure, the optical collection device may be arranged behind the display device. The first region of the display device may be deployed in the collection range of the optical data collection device collecting the optical data in the first power consumption state. The control device may change the optical state of the first region by controlling the first optical component subset of the display device to satisfy the collection requirement of the optical collection device. The optical collection device may not need to be separated from other components and arranged to face the external environment, which may ensure the integrity of the electronic device.

Moreover, when the optical collection device is in the working state, that is, in the first power consumption state, the user may not need to obtain the first optical data for characterizing the external environment of the electronic device. In this case, the control device may control the first optical component subset to switch the optical state of the first region to the second optical state. As such, the optical collection device may only collect the second optical data, which may not characterize the external environment of the electronic device. That is, even if the optical collection device may be called by other applications, the optical collection device may not obtain the first optical data, which characterizes the external environment of the electronic device. Therefore, potential security issues may be eliminated, and the safety of using the electronic device may be improved.

In addition, if the optical state change of the first region of the display device may be visually expressed, the display device may also prompt the user of the electronic device of the current state of the optical collection device. That is, the optical collection device may collect the optical data that characterizes the external environment of the electronic device. For example, in the image collection application, if the optical collection device is the camera, the optical state change of the first region of the display device may intuitively inform the user whether the current camera can normally collect the image of the external environment.

Figure 5A:
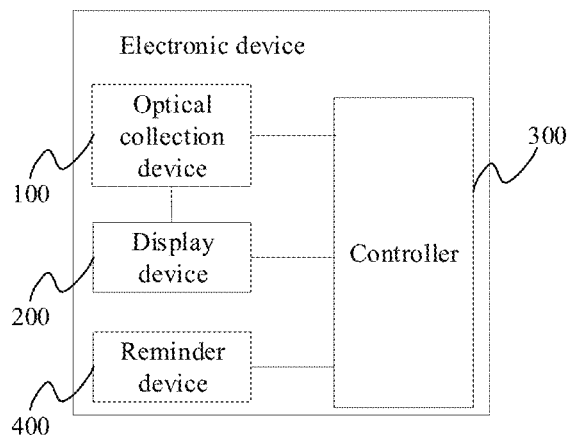
FIG. 5a illustrates a schematic structural diagram showing an electronic device according to some other embodiments of the present disclosure.
Figure 5B:
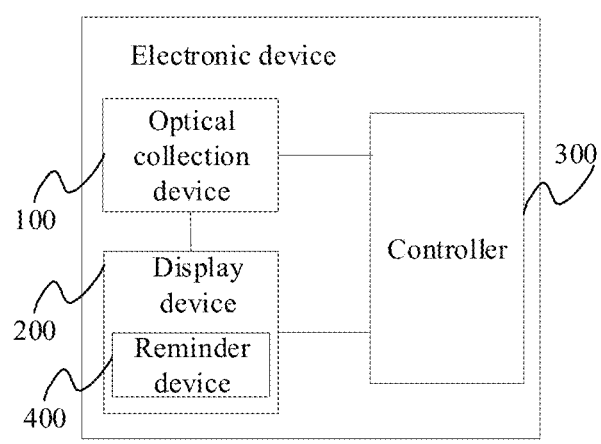
FIG. 5b illustrates a schematic structural diagram of an electronic device according to some other embodiments of the present disclosure.

In some embodiments, the optical collection device 100 is hidden behind the display device, and the different optical state of the first region of the display device may not be intuitively presented. To inform the user of the electronic device about the optical state of the first region or the power consumption state of the optical collection device 100, as shown in FIG. 5a and FIG. 5b, the electronic device further includes a reminder device 400. The reminder device 400 may be configured to prompt the user with the power consumption state of the optical collection device 100 or the optical state of the first region. The present disclosure does not limit a specific structure or the prompt method of the reminder device 400.

In some embodiments, as shown in FIG. 5a, the reminder device 400 may be an individual component, which can prompt the power consumption state of the optical collection device 100 or the optical state of the first region. The prompt of the two states may be implemented by one prompt component of the reminder device or by another different prompt component, which is not limited by the present disclosure.

In some other embodiments, as shown in FIG. 5b, the reminder device 400 is arranged in the display device 200. In this case, the reminder device 400 may be used as a portion of the display device 200, which is arranged in the electronic device. Therefore, the display device 200 further includes a second region. The reminder device 400 is arranged in the second region. The prompt method of the reminder device 400 for the power consumption state of the optical collection device 100 or the optical state of the first region may be realized by changing the display state of the second region, such as changing the display status of display brightness, color, text content, etc., of the second region.

In some embodiments of some implements, the display device 200 may include the first region and the second region. The second region may be a surrounding region of the first region. The first region may be the region corresponding to collecting the optical data.

Figure 5C:
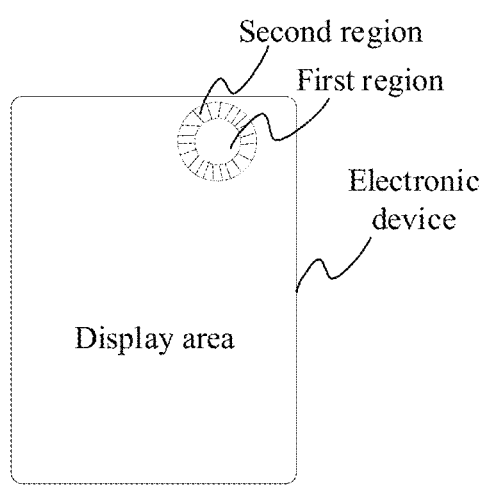
FIG. 5C illustrates a schematic structural diagram showing layout relationship between a first region and a second region of a display device of the electronic device according to some embodiments of the present disclosure.
Figure 5D:
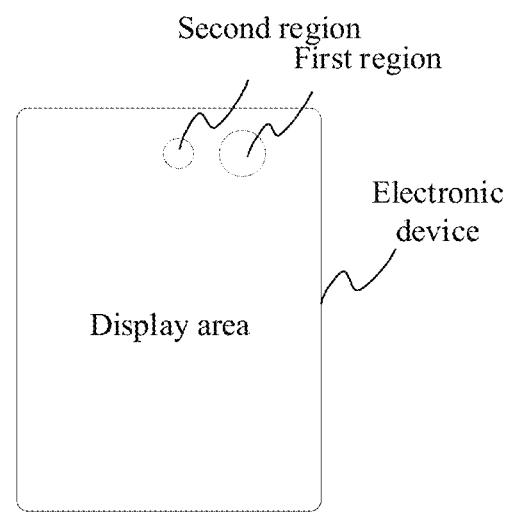
FIG. 5D illustrates a schematic structural diagram of layout relationship between the first region and the second region of the display device of the electronic device according to some other embodiments in the present disclosure.

In some embodiments, the second region may be closed and reflect the region of the boundary of the first region. As shown in FIG. 5C, the first region may be surrounded by the second region. The first region may be a circle, and the second region may be a ring (e.g., the scribed ring region in FIG. 5C). However, the layout of the two regions is not limited to FIG. 5C. The first region and the second region may also be independent of each other. As shown in FIG. 5D, region shapes of the first region and the second region may not be limited to the circle as shown in FIG. 5C and FIG. 5D and maybe other shapes. The shape may be determined by the requirement of a specific application. FIGS. 5C and 5D are only used as schematic illustrations of the layout relationship between the first region and the second region. In addition, in applications of some implements, the reminder device 400 may also be an LED indicator. The prompting effect described by embodiments may be achieved by changing on/off or flashing of the LED indicator. For the control of the LED indicator, reference can be made to the description of the corresponding part of the above-described embodiments.

In some embodiments, the first region of the display device may change the optical state according to the first control signal, and the second region may change the optical state according to the second control signal. That is, the first optical component subset 210 located in the first region may change the optical state of the first region according to the first control signal. A second optical component subset 220 located in the second region may change the optical state of the second region according to the second control signal. The present disclosure does not limit the source and contents of the first control signal and the second control signal.

In some embodiments, the first control signal may be output by the optical collection device 100, that is, the first region may change the optical state according to the control of the optical collection device 100. For example, the optical collection device 100 is in the first power consumption state, and the optical data that may characterize the external environment of the electronic device may be determined to be collected. In this situation, the device may control the first region to enter the first optical state. The image collection application scenario may be used as an example. After turning the camera on, the device may detect the image collection instruction to control the first region to enter the first optical state, such that the camera may capture the image of the external environment. The optical collection device 100 may be in the first power consumption state, in certain cases the optical data that can characterize the external environment of the electronic device may not be required. In this situation, the device may control the first region to enter the second optical state. The image collection application scenario may be further used as an example. Even though the device turns the camera on, the device may not be able to use the camera to capture clear images of the external environment.

The detection rule of determining whether the device needs to collect the optical data that can characterize the external environment of the electronic device may be an on/off operation of the user to the image collection application. In some embodiments, whether to collect the optical data that can characterize the external environment of the electronic device may be determined by responding to the voice information or gesture information input by the user. As such, the device may control the first region to switch to the corresponding optical state. The device may also control the optical collection device to enter the working state first by responding to the operation of the user to the preset button. Then, the device may detect whether to collect the optical data that can characterize the external environment of the electronic device. The preset button maybe a hotkey, which may be convenient for the user to manually and directly turn on or off the optical collection device (e.g., the camera). The control method for turning on or off the optical collection device is not limited to the methods listed above.

The second control signal may be a display data. In this case, the second optical component subset 220 may change the optical state of the second region according to the display data. For example, in a scenario where the optical state of the second region plays a role as a reminder, the content (i.e., display data) displayed in the display region of the electronic device indicates that the power consumption state of the optical collection device is changed, or the optical state of the first region is changed. Therefore, the device may change the optical state of the second region, so that the user may obtain the corresponding state change of the electronic device by viewing the current optical state of the second region.

If the change of the optical state of the second region is used to illustrate the change of the working state of the electronic device, the device may output the display data in the display region where the electronic device may be detected and control the second optical component subset to change the optical state of the second region. The present disclosure does not limit the contents and the generation methods of the second control signal which is used to control the change of the optical state of the second region. The contents and generation method of the second control signal may be determined according to the role played by the change of the optical state of the second region in a specific application scenario, which is not limited to the above-listed embodiments.

In some embodiments, the control bodies of the different optical component subsets in the display device may be different, or some control bodies of some optical component subsets may be the same. The present disclosure provides some detailed structures for the control device 300, which are not limited to the description below.

Figure 6A:
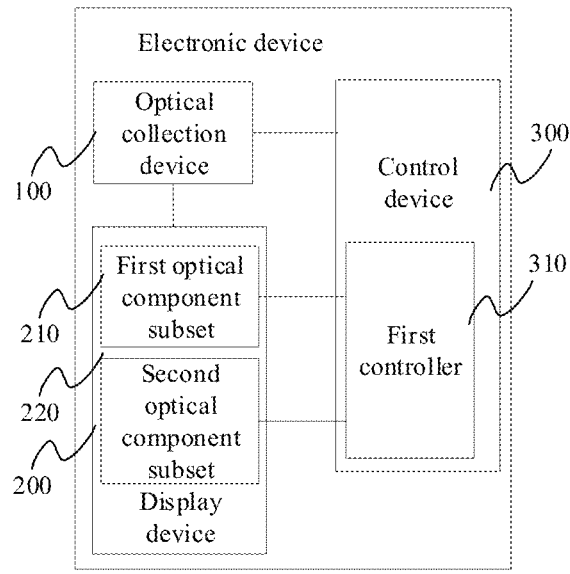
FIG. 6A illustrates a schematic structural diagram of an electronic device according to some other embodiments of the present disclosure.

Referring to FIG. 6A, the control device 300 includes a first controller 310. The first controller may be configured to control the first optical component subset 210 located in the first region and the second optical component subset 220 located in the second region of the display device 200 to change the optical states of the corresponding regions.

In some embodiments, the first controller 310 may include an embedded controller (EC) (e.g., EC may be a controller configured to control input and output devices) in an electronic device host. As described above, in the electronic device shown in FIG. 6A, the EC may be configured to control the first optical component subset 210 to change the optical state of the first region. As such, to the device may switch the first region between the first optical state and the second optical state to satisfy the user's requirement of the optical data in the corresponding scenario (e.g., a scenario of using the camera to collect the image or not to collect the image, or other collection application scenarios). Thereby, the device may flexibly and automatically control whether to allow to obtain the optical data of the external environment of the electronic device.

In some embodiments, for the entire display region of the electronic device, the region complementary to the above-described first region may be marked as a third region (e.g., the third region may include the second region). The plurality of unit optical component collection located in the third region may be marked as a third optical component subset. As such, another controller (e.g., distinguished from the controller of the first controller 310, such as the graphics card, etc.) may control a third optical component subset to change the optical state of the third region. Another controller is not marked in FIG. 5A. The third optical component subset may be controlled by the first controller 310, and the present disclosure does not limit the control host of the third optical component subset.

Figure 6B:
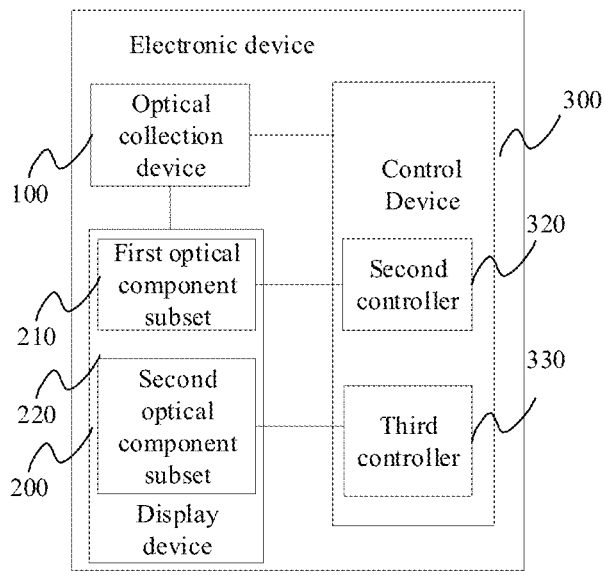
FIG. 6B illustrates a schematic structural diagram of an electronic device according to some other embodiments of the present disclosure.

In some embodiments, different from the above-described embodiments, the first optical component subset 210 and the second optical component subset 220 may be controlled by different controllers. Therefore, as shown in FIG. 6B, the control device 300 includes a second controller 320 and a third controller 330.

The second controller 320 may control the first optical component subset 210 located in the first region of the display device 200 to change the optical state of the first region. The third controller 330 may control the second optical component subset 220 located in the second region of the display device 200 to change the optical state of the second region. For the effect achieved by changing the optical state of the first region and the optical state of the second region, reference may be made to the description of the corresponding part of the above-described embodiments, which is not repeated.

In some embodiments, the second controller 320 may be the first controller 310, e.g., the EC in the electronic device host. The third controller 330 may be a graphic card or other types of controller inside the host. As such, the optical state change of the first region of the display device of the electronic device may be controlled and implemented by the EC. The present disclosure does not limit the specific method of how to realize the switching and controlling between the first optical state and the second optical state of the first region.

In some embodiments, the control device 300 may include the second controller 320 and the third controller 330 in the host. In this case, the second optical component subset located in the second region of the display device can also be controlled by the second controller 320 to change the optical state of the second region. That is, under the structure of the control device, the change of the optical state of the second region may be realized by the second controller 320 and/or the third controller 330 controlling the second optical component subset.

The third controller 330 maybe a graphics card that controls the display status change of the display screen in the electronic device. if the reminder device 400 is correspondingly arranged in the second region. In some embodiments, the graphics card may control the change of the display content of the second region (e.g., display brightness, color, text, etc.). Thus, corresponding prompting purposes may be achieved, such as prompting of the power consumption state of the optical collection device or the current optical state of the first region.

In addition, in some embodiments, in connection with the above analysis, if the entire display region of the display device may further include the third region defined above. In this case, the third controller 330 may control the third optical component subset located in the third region to change the optical state of the third region, which is not limited to this control method.

In some embodiments, the second region of the display device may be represented by differentiating the display state of the third region. Further, the second region may differentiate the colors of the adjacent regions of the second region. In this case, the third controller 330 may obtain the current display color of the adjacent region of the second region, determine the color different from the current display color is the target display color of the second region, and control the second region to present the target display color to achieve the prompting purpose. The present disclosure does not limit the method of differentiating the display color between the second region and its adjacent region. For example, the final differentiation of these two regions may be achieved by flashing a single color, alternating flashing of two colors, etc. As such, when the third region of the display device currently displays colored contents, and the color of the second region is different from the color of the adjacent region, the user can accurately know the optical state of the second region.

Figure 7:
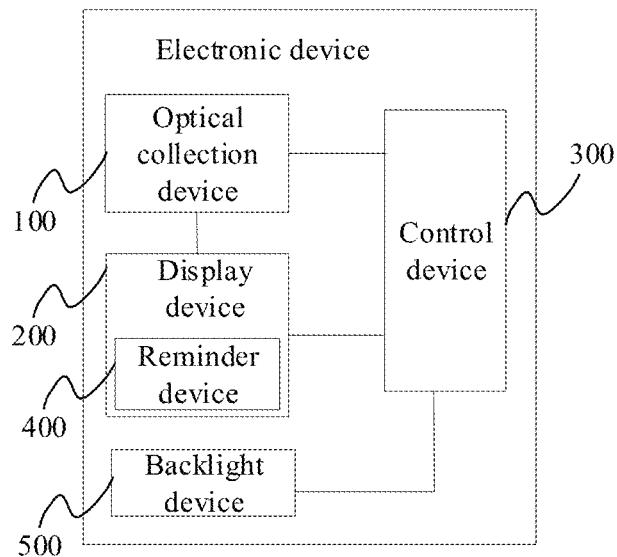
FIG. 7 illustrates a schematic structural diagram of an electronic device according to some other embodiments of the present disclosure.

Based on the above-mentioned embodiments, as shown in FIG. 7, the electronic device further includes a backlight device 500. The backlight 500 may be arranged at least corresponding to the second region of the display device 200. The backlight device 500 may be used to provide backlight light to enable a preset content to be presented through the second optical component subset 220.

In some embodiments, the backlight device 500 may include a light source device that can ensure the back of the third region of the display device can be lighted, so that when the third region is in a different optical state, the third region may output the desired display content or be in a black screen state. At this time, the second region may be a portion of the third region. According to actual needs, the optical state of the second region can be changed to make the second region present the preset content, such as changing the preset contents of the brightness, color, etc.

For the structure of the electronic device of the above-described embodiments, the corresponding drawings may be only used to illustrate components of the electronic device of embodiments, and do not limit a connection mode between the components shown in the drawings. According to the actual needs, the connection relationship between the corresponding components in the drawings may be flexibly adjusted, which is not be described in detail here.

Figure 8:
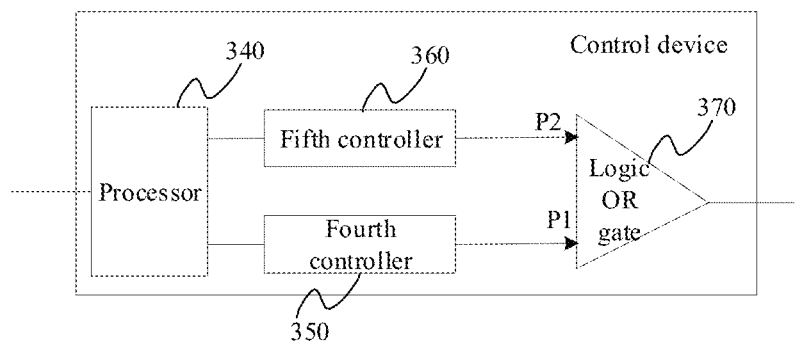
FIG. 8 illustrates a schematic structural diagram showing a control device of the electronic device according to some embodiments of the present disclosure.

Based on the description of the above-embodiments of the control device 300 of the electronic device, to change the optical state of the first region and the second region, the control signals for changing the optical states of the two regions may be the same. As shown in FIG. 8, the control device 300 also includes a processor 340, a fourth controller 350, a fifth controller 360, and a logical OR gate 370. An output terminal of the fourth controller 350 is connected to a first input terminal PI of the logical OR gate 370. An output terminal of the fifth controller 360 is connected to the second input terminal P2 of the logical OR gate 370.

In some embodiments, the optical collection device 100 may be a camera. For example, the user may use the camera to collect the image. When the camera is on, the user of the electronic device may turn on the installed image collection application. That is, the user needs to use the camera of the electronic device to collect the image. At this point, the device may control the first region of the display device to enter the first optical state according to the above method. Similarly, the user may close the image collection application. When the image collection is not needed, the device may control the first region to enter the second optical state. As such, the processor 340 may obtain a third control signal generated by the control operation for the image collection application, that is, the control signal generated by the user starting or closing the image collection application. Since the processor 340 is connected to the fourth controller 350 and the fifth controller 360, the output terminals of those two controllers may be processed by a logical OR gate 370 to obtain a fourth control signal that may directly control the optical state change of the first region. Based on the logic control of the logical OR gate 370, in some embodiments, the fourth controller 350 and/or the fifth controller 360 may respond to the third control signal to cause the logical OR gate 370 to output the fourth control signal to control and change the optical state of the first region.

For example, when the image collection application is turned on, according to the above-described processing process, as long as any input terminal of the logical OR gate receives a control signal that characterizes the information, the output terminal may output the fourth control signal that controls the first region to enter the first optical state. As such, the optical state for the first region may be switched and controlled.

Figure 9:
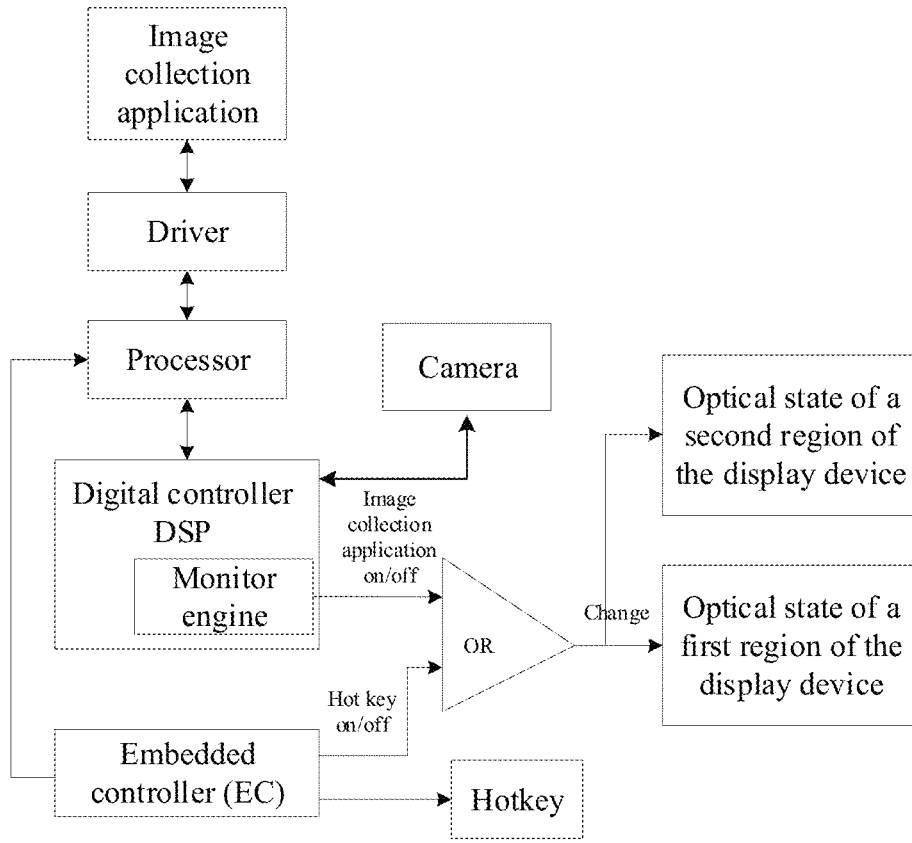
FIG. 9 illustrates a schematic application structural diagram showing the control device of the electronic device according to some embodiments of the present disclosure.

In some embodiments, for example, the optical collection device 100 maybe still the camera. The user may use the camera to collect the image. The fourth controller 350 may be an EC. The fifth controller 360 may be a digital controller DSP (Digital Signal Processing). The processor 340 may be a central processor unit (CPU). As such, the connection relationship of each component of the control device 300 may be shown in FIG. 9. The DSP may be connected to the second input terminal of the logic OR gate through a monitor engine. The DSP and EC may be connected to the two input terminals of the logic OR gate through their own general-purpose input/output (GPIO) terminals. The DSP and EC may also control the change of the optical state of the first region of the display device. As shown in FIG. 9, The DSP and EC may further control the change of the optical state of the second region of the display device at the same time.

In some embodiments, when the first optical component subset of the display device is powered on, e.g., the user is using the electronic device, the liquid crystal particles of the display device may be arranged in an orderly manner. The first region may have a relatively high light transmittance, and may even be transparent. The electronic device user may normally use the camera to collect the image. Correspondingly, when the first optical component subset of the display device is powered off, the liquid crystal particles in the display device may be arranged disorderly. The first region may have a very low light transmittance, and may even appear in an opaque state such as white. As such, the camera is in a safety protection mode and cannot be used to collect the image normally.

As shown in FIG. 9, the present disclosure may also set a hot-key for opening or closing the camera, the hot-key may be connected to the EC. If the user closes the camera through the hot-key, the first region of the display device may always stay in the second optical state, that is, the camera is in a safety protection mode. Thus, the processor may send the optical state of the first region to a driver, and even if the user starts the image collection application, the driver may not need to respond to the start operation of the image collection application until the user turns on the camera through the hot-key again. The optical state of the first region may be changed according to the method, then, the image collection application can be used normally. The control priority of the hotkey to the camera is higher than the control priority of the image collection application to the camera. For the change and control process of the optical state of the first region, reference may be made to the description of the corresponding part of the above embodiments, which are not repeated.

If the user controls the first region of the display device through the hotkey to power on, the driver may detect the corresponding control signal and continue to respond to the user's starting/closing operation of the image collection application to control the camera on/off. When the camera is turned off in this way, the corresponding control signal may be sent to the EC. The EC may respond to the control signal to control the first region of the display device to power off, so that the first region may enter the safety protection mode until the hotkey is operated again to control the first region of the display device to be powered on. Then, the above processing process may be continued.

The present disclosure does not limit the implementation of how to control the power-on and power-off of the first region of the display device. The power supply for the first region of the display device may be controlled to turn on/off, which is not limited to this.

In summary, the camera of the electronic device of embodiments of the present disclosure may be arranged behind the screen of the display device to ensure the integrity of the screen. In some embodiments, the control device may directly control the change of the optical state of the first region of the display device to cause the camera of the electronic device to enter the safety protection mode. That is, no additional device is needed to switch the first region from a transparent state (the state with high light transmittance, which is not limited in a fully transparent state) to the white opaque state (the state with very low light transmittance, not limited to the white opaque state). Therefore, there is no loss of storage, and the device may prompt the user of the current state of the camera so that the user's privacy is protected, and the user experience is improved.

Moreover, the optical states of the first region and the second region of the display device may be switched at the same time, which further explicitly reminds the user of the working state of the current camera and improves safety. In addition, as shown in FIG. 9, the hotkeys and drivers are used to dynamically realize the switching of the optical state of the first region to provide an intelligent user experience.

The present disclosure does not limit the product type of the electronic device described in the above-described implements, which includes a terminal device, such as a cell phone, a laptop computer, a tablet, etc. Moreover, the composition structure of the electronic device is not limited to the parts listed in the above embodiments and can be adjusted according to actual needs to obtain electronic devices with more or fewer components, which is not described in detail.

Figure 10:
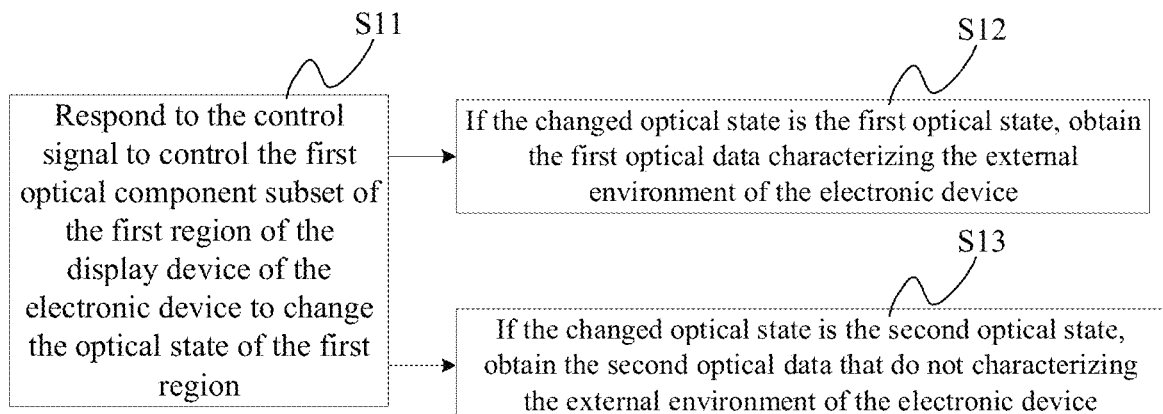
FIG. 10 illustrates a schematic flowchart of a control method according to some embodiments of the present disclosure.

In connection with the description of the above embodiments of the components and functions of the electronic device, the control process of the electronic device is described below. FIG. 10 illustrates a schematic flowchart of a control method according to some embodiments of the present disclosure. The method may be applied to the electronic device. The components and functions of the electronic device may refer to the description of the corresponding part of the above-mentioned implements. The present disclosure does not limit the product type of the electronic device. As shown in FIG. 10, the control method may include but is not limited to the following processes.

At S11, the device responds to the control signal to control the first optical component subset of the first region of the display device of the electronic device to change the optical state of the first region.

In some embodiments, the first region may at least include the first optical state and the second optical state. The display device of the electronic device may include the optical component collection arranged in the array. Thus, the first optical component subset may be the collection of the plurality of unit optical components of the optical collections. The optical collection device of the electronic device may include the first power consumption state and the second power consumption state. When in the first power consumption state, the device may obtain the optical data in the collection range. The first region may be located in the collection range of the optical collection device. For the structure of the display device of the electronic device, and how the control device controls the display device to implement process S11, reference may be made to the description of the corresponding part of electronic device embodiments.

The control signal of process S11 may be generated by responding to the starting or closing operation of the optical collection device. The control signal of process S11 may also be generated by the optical collection device responding to the image collection application (or use the collection application of the optical data of the external environment) in the first power consumption state. Through the hotkey, voice information, or gesture information, the control device of the electronic device may be informed whether the optical data that characterize the external environment needs to be obtained or not currently.

At S12, if the changed optical state is the first optical state, the device obtains the first optical data that can characterize the external environment of the electronic device.

At S13, if the changed optical state is the second optical state, the device may not obtain the first optical data that characterize the external environment of the electronic device.

For the contents of the first optical state and the second optical state of the first region and the controlling and switching methods, reference may be made to the description of the corresponding part of above embodiments, which are not described in detail.

In summary, in some embodiments, the device may directly change the optical state of the first region of the display device to satisfy the collection requirement of the optical collection device. The optical collection device may be arranged behind the screen of the display device. The optical collection device may not need to be separated from other devices and arranged to face the external environment, which ensures the integrity of the electronic device.

In connection with the description of the electronic device embodiments, since the optical collection device is hidden behind the screen of the display device, the control method further includes prompting the power consumption state of the optical collection device or the optical state of the first region. That is, when the power consumption state of the optical collection device or the optical state of the first region change, the corresponding prompt information may be output to remind the user of the working mode of the optical collection device or the optical state of the first region in a visual manner.

In some embodiments, multiple control methods of the optical state change of the first region and the second region of the above-described display device may be included. For details, reference may be made to the description of the corresponding part of electronic device embodiments, which are repeated.

The application scenarios for the above electronic device embodiments and control method embodiments are not limited to image collection application scenarios, and may also include brightness adjustment application scenarios, color temperature adjustment application scenarios, etc. The optical data collected by the optical collection device in different scenarios may be different. However, in different application scenarios of the electronic device, the function realization process of each component is similar, and the control process realized by the electronic device is similar. Embodiments of the present disclosure may not describe each of the application scenarios. To describe the scenarios, reference may be made to the image collection application scenario described above to understand the solution.

In addition, various embodiments in the specification are described in a progressive or parallel manner. Each embodiment focuses on the differences from other embodiments, and the same or similar parts between various embodiments may be referred to as each other. For the method disclosed in some embodiments, since it corresponds to the electronic device disclosed in some embodiments, the description is relatively simple, and the relevant part may be referred to the description of the electronic device.

The above description of embodiments of the present disclosure enables those skilled in the art to implement or use the present disclosure. Various modifications may be made by those skilled in the art to embodiments of the present disclosure, and the general principles defined in this specification may be implemented in other embodiments without departing from the spirit or scope of the present disclosure. Therefore, the present disclosure may not be limited to the embodiments shown in this specification but should conform to the widest scope consistent with the principles and novel features disclosed in this specification.

What is claimed is:

1. An electronic device, comprising:
   an optical collection device having a first power consumption state and a second power consumption state, and in response to being in the first power consumption state, the optical collection device being configured to obtain optical data in a collection range;
   a display device including an optical component collection arranged in an array, and the display device including a first region located in the collection range of the optical collection device;
   a control device configured to control a first optical component subset of the optical component collection in the first region to cause the first optical component subset in the first region to change between a first optical state and a second optical state; and
   a reminder device entirely arranged in a second region of the display device surrounding the first region and configured to prompt a power consumption state of the optical collection device or the optical state of the first region;
   wherein:
      in the first optical state, the optical collection device is allowed to obtain first optical data, the first optical data characterizing an external environment of the electronic device;
      in the second optical state, the optical collection device is allowed to obtain second optical data, the second optical data not characterizing the external environment of the electronic device;
      the display device further includes a third region for display colored content, the third region being different from the first region and the second region; and
   the control device is configured to:
      in response to at least one of a closing operation of the optical collection device or a closing operation of an image collection application when the optical collection device is in the first power consumption state, control the first optical component subset in the first region to cause the first optical component subset to change from the first optical state to the second optical state;
      in response to at least one of a starting operation of the optical collection device or a starting operation of the image collection application when the optical collection device is in the first power consumption state, control the first optical component subset in the first region to cause the first optical component subset to change from the second optical state to the first optical state;
      obtain a current display color of an area of the third region that is adjacent to the second region;
      determine a target display color of the reminder device in the second region, the target display color being different from the current display color of the area of the third region that is adjacent to the second region; and
      control the reminder device in the second region to present the target display color to prompt the power consumption state of the optical collection device or the optical state of the first region.

2. The electronic device of claim 1, wherein:
   the first optical component subset located in the first region of the display device changes the optical state according to a first control signal; and
   a second optical component subset located in the second region of the display device changes the optical state according to a second control signal.

3. The electronic device of claim 1, wherein:
   the control device includes a first controller; and
   the first controller controls the first optical component subset located in the first region and a second optical component subset located in the second region of the display device to change optical states of corresponding optical component subsets.

4. The electronic device of claim 1, wherein:
   the control device includes a second controller and a third controller;
   the second controller controls the first optical component subset located in the first region to change the optical state of the first optical component subset in the first region; and
   the third controller controls a second optical component subset located in the second region of the display device to change an optical state of the second optical component subset in the second region.

5. The electronic device of claim 2, wherein:
   the first optical component subset changes the optical state of the first optical component subset in the first region according to a control of the optical collection device; and
   the second optical component subset changes the optical state of the second optical component subset in the second region according to display data.

6. The electronic device of claim 1, further comprising:
a backlight device arranged corresponding to the second region of the display device and configured to provide backlight to display preset content through a second optical component subset.

7. The electronic device of claim 1, wherein the control device includes:
a logic OR gate;
a processor configured to obtain a third control signal generated for a control operation of the image collection application;
a fourth controller, an output terminal of the fourth controller being connected to a first input terminal of the logic OR gate; and
a fifth controller, an output terminal of the fifth controller being connected to a second input terminal of the logic OR gate;
wherein the fourth controller and/or the fifth controller respond to the third control signal to control the first optical component subset located in the first region to change the optical state of the first optical component subset in the first region.

8. A control method for controlling an optical collection device, comprising:
responding to a control signal to control a first optical component subset in a first region of a display device of an electronic device to change an optical state of the first optical component subset in the first region, including:
in response to at least one of a closing operation of the optical collection device or a closing operation of an image collection application when the optical collection device is in a first power consumption state, controlling the first optical component subset in the first region to cause the first optical component subset to change from a first optical state to a second optical state; and
in response to at least one of a starting operation of the optical collection device or a starting operation of the image collection application when the optical collection device is in the first power consumption state, controlling the first optical component subset in the first region to cause the first optical component subset to change from the second optical state to the first optical state; and
prompting, by a reminder device entirely arranged in a second region of the display device surrounding the first region, a power consumption state of the optical collection device or the optical state of the first optical component subset in the first region, including:
obtaining a current display color of an area, that is adjacent to the second region, of a third region of the display device, the third region being different from the first region and the second region, and being configured to display colored content;
determining a target display color of the reminder device in the second region, the target display color being different from the current display color of the area of the third region that is adjacent to the second region; and
controlling the reminder device in the second region to present the target display color to prompt the power consumption state of the optical collection device or the optical state of the first region;
wherein:
the display device includes an optical component collection arranged in an array;
the first optical component subset is a collection of a plurality of unit optical components of the optical component collection;
the optical collection device has a first power consumption state and a second power consumption state, and in response to the optical collection device being in the first power consumption state, the optical collection device obtains optical data in a collection range;
the first region is located in the collection range of the optical collection device;
in the first optical state, the optical collection device is allowed to obtain first optical data characterizing an external environment of the electronic device; and
in the second optical state, the optical collection device is allowed to obtain second optical data that do not characterize the external environment of the electronic device.

9. The method of claim 8, wherein responding to the control signal to control the first optical component subset in the first region of the display device of the electronic device to change the optical state of the first optical component subset in the first region further includes:
controlling the first optical component subset located in the first region of the display device to change the optical state according to a first control signal; and
controlling a second optical component subset located in the second region of the display device to change the optical state according to a second control signal.

10. The method of claim 8, wherein responding to the control signal to control the first optical component subset in the first region of the display device of the electronic device to change the optical state of the first optical component subset in the first region further includes:
controlling, by a first controller, the first optical component subset located in the first region and a second optical component subset located in the second region of the display device to change optical states of corresponding optical component subsets.

11. The method of claim 8, wherein responding to the control signal to control the first optical component subset in the first region of the display device of the electronic device to change the optical state of the first optical component subset in the first region further includes:
controlling the first optical component subset located in the first region to change the optical state of the first optical component subset in the first region by the second controller; and
controlling a second optical component subset located in a second region of the display device to change an optical state of the second optical component subset in the second region by a third controller.

12. The method of claim 11, wherein responding to the control signal to control the first optical component subset in the first region of the display device of the electronic device to change the optical state of the first optical component subset in the first region further includes:
changing the optical state of the first region according to a control of the optical collection device; and
changing the optical state of the second region according to display data.

13. The method of claim 8, wherein the electronic device further includes:
a backlight device arranged corresponding to the second region of the display device and configured to provide backlight to display content through a second optical component subset.

14. The method of claim 8, wherein:

the electronic device further includes a control device, the control device includes:
- a logic OR gate;
- a processor configured to obtain a third control signal generated for a control operation of the image collection application;
- a fourth controller, an output terminal of the fourth controller being connected to a first input terminal of the logic OR gate; and
- a fifth controller, an output terminal of the fifth controller being connected to a second input terminal of the logic OR gate; and responding to the control signal to control the first optical component subset in the first region of the display device of the electronic device to change the optical state of the first optical component subset in the first region further includes:
- obtaining a third control signal generated for the control operation of the image collection application; and
- responding to the third control signal to control the first optical component subset located in the first region to change the optical state of the first optical component subset in the first region.

15. The electronic device of claim 1, wherein:

the reminder device includes a plurality of LED indicators arranged surrounding the first region and in the second region of the display device.

16. The electronic device of claim 1, wherein:

the second region is closed and reflects a region of a boundary of the first region.

17. The electronic device of claim 1, wherein:

the first region includes a circle; and
the second region includes a ring surrounding the circle.

* * * * *